United States Patent [19]
Kaliski

[11] Patent Number: 5,378,399
[45] Date of Patent: Jan. 3, 1995

[54] FUNCTIONAL COMPLEX MICROGELS WITH RAPID FORMATION KINETICS

[75] Inventor: Adam F. Kaliski, East Windsor, N.J.

[73] Assignee: Industrial Progress, Inc., East Windsor, N.J.

[21] Appl. No.: 919,831

[22] Filed: Jul. 27, 1992

Related U.S. Application Data

[63] Continuation-in-part of Ser. No. 775,025, Oct. 11, 1991, abandoned, which is a continuation of Ser. No. 472,763, Jan. 31, 1990, abandoned.

[51] Int. Cl.⁶ .............................................. B01J 13/00
[52] U.S. Cl. ............................. 252/313.1; 252/315.5; 423/328.1; 423/326
[58] Field of Search ............ 252/313.1, 315.5; 423/328.1, 326

[56] References Cited

U.S. PATENT DOCUMENTS

| | | | |
|---|---|---|---|
| 2,176,876 | 10/1939 | Alessandroni | 106/422 |
| 2,974,108 | 3/1961 | Alexander | 252/313.1 |
| 3,002,932 | 10/1961 | Duwell | 252/315.5 |
| 3,453,131 | 7/1969 | Fadner | 106/416 |
| 3,476,692 | 11/1969 | Hoffmann | 252/315.5 |
| 3,484,271 | 12/1969 | Kaliski | 428/421 |
| 3,726,700 | 4/1973 | Wildt | 106/437 |
| 3,804,656 | 4/1974 | Kaliski et al. | 106/487 |
| 4.075,030 | 2/1978 | Bundy et al. | 106/416 |
| 4,217,240 | 8/1980 | Bergna | 252/313.1 |
| 4,239,615 | 12/1980 | Tu | 208/120 |
| 4,241,142 | 12/1980 | Kaliski et al. | 428/511 |
| 4,247,420 | 1/1981 | Dumoulin et al. | 252/453 |
| 4,346,178 | 8/1982 | Economou | 106/416 |
| 4,927,498 | 5/1990 | Rushmere | 162/168.3 |
| 5,116,418 | 5/1992 | Kaliski | 106/419 |
| 5,176,891 | 1/1993 | Rushmere | 423/328.1 |
| 5,279,807 | 1/1994 | Moffet et al. | 423/338 |
| 5,296,213 | 3/1994 | Haase et al. | 423/326 |

FOREIGN PATENT DOCUMENTS

WO87/00544 1/1987 WIPO.

*Primary Examiner*—Robert L. Stoll
*Assistant Examiner*—Daniel S. Metzmaier

[57] ABSTRACT

Complex (multicomponent) functional microgels with rapid formation kinetics and compositions thereof, as well as process for synthesizing said complex microgels in aqueous media.

10 Claims, No Drawings

FUNCTIONAL COMPLEX MICROGELS WITH RAPID FORMATION KINETICS

This application is a continuation-in-part of the patent application Ser. No. 07/775,025 ("Functional Complex Microgels with Rapid Formation Kinetics"), filed Oct. 11, 1991, now abandoned, which is a continuation of patent application Ser. No. 07/472,763 filed Jan. 31, 1990, now abandoned.

BACKGROUND OF THE INVENTION

1. Field of the Invention

The present invention relates to complex (multicomponent) functional microgels and compositions thereof as well as to a process for synthesizing said complex microgels in aqueous media.

A preferred embodiment of the invention relates to the synthesis of complex microgels, as such, to be used, among other things, as catalysts, carriers for immobilization of biologically active materials, fillers for plastics, filtration aids and ultrahigh-bulking pigments.

Another preferred embodiment of the invention relates to synthesizing, in situ, complex functional microgels in aqueous dispersions of particulate matter to provide improved and novel useful products through one or more of the following:

(a) instantaneous, indiscriminate and complete flocculation of said particulate matter;

(b) intrinsic cementation of the resultant particle aggregates; and (c) surface-chemical modification of the resultant aggregate products.

The complex functional microgels of the present invention are synthesized by a rapid, virtually instantaneous cross-linking of in-situ-preformed transient, chemically reactive subcolloidal sodium-silico-aluminate and similar hydrosols with the aid of bivalent and/or multivalent inorganic salts and/or organic, cationically active chemical compounds with at least two reactive groups in each molecule.

2. Discussion of the Relevant Art

The related known art deals with monocomponent silica and bicomponent alumino-silicate systems in the form of gels, sols and precipitates, described by the general chemical formulas of $[SiO_2]_m$, or $[(SiO_2)_m(Al_2O_3)_n]_p$, where m, n and p represent arbitrary numbers. On the other hand, the complex microgels of the present invention, having at least three analogous components in their molecular make-up, have been hitherto unknown in the prior art to the best of the applicant's knowledge. In a most simple case, the complex microgels under discussion can be exemplified chemically by calcium-silico-aluminates, described by a general formula of $[(CaO)_m(SiO_2)_n(Al_2O_3)]_n$, where m, n, p and u represent arbitrary numbers.

To avoid potential confusion with regard to the subject matter under discussion, it is important to emphasize the fundamental difference between intrinsic multicomponent systems, such as the above-mentioned calcium-silico-aluminate microgels in which CaO, $SiO_2$ and $Al_2O_3$ are chemically bound within the same molecules, and analogous blended multicomponent systems exemplified by silicomagnesium-aluminate-hydrate gels disclosed by Hoffmann in U.S. Pat. No. 3,476,692. It should be pointed out, though, that calling Hoffmann's continuous gels silicomagnesium-aluminate-hydrates,, is misleading from the standpoint of chemical terminology in that, contrary to what the name implies, the latter are not indivisible chemical compounds (which cannot be separated into individual components without destroying the very compounds, as such) but are manufactured by first synthesizing a continuous silico-aluminate gel and, subsequently, precipitating a magnesium hydroxide in a chemically and colloidally already established continuous silico-aluminate gel.

It is also important to emphasize the distinction between the complex (multicomponent) microgels, e.g., those of the above-mentioned calcium-silico-aluminate type, on the one hand, and, for example, calcium-ion-loaded alumino-silicate (zeolite) cation exchangers, on the other. Whereas calcium is chemically bound within the calcium-silico-aluminate macromolecules making up the complex microgels under discussion, the alumino-silicate cation exchangers are fundamentally bicomponent chemical compounds of alumina and silica and remain invariably such bicomponent alumino-silicates regardless of which particular mobile bivalent or multivalent cations they may acquire by way of the reversible ion-exchange mechanism.

It should further be emphasized that no microgels, even of a simple monocomponent silica or bicomponent silico-aluminate type, had ever been demonstrated in the prior art to exist in the form of stable, permanent formations qualifying them as legitimate end products. Quite to the contrary, as shall be explained hereinafter it is fundamentally impossible to convert the relatively slowly forming, continuously changing silica or silico-aluminate microgels into such stable, permanently fixed formations (end products).

Although, to the best of the applicant's knowledge, there is a total lack of prior-art references pertaining directly to the subject matter of the present invention, even remotely related such references shall be discussed hereinafter whenever deemed useful to explaining the subject matter in question.

In accordance with the foregoing and disclosures to follow, the general object of the present invention is to provide a process and compositions for the manufacture of novel complex (multicomponent) functional microgels, which are useful as such or in conjunction with particulate matter.

More specifically, the object of the invention is to provide a process and compositions for synthesizing complex functional microgels in aqueous media by a rapid, virtually instantaneous, cross-linking of in-situ-preformed transient, chemically reactive subcolloidal silico-aluminate and similar hydrosols with the aid of bivalent (multivalent) inorganic salts and/or organic, cationically active chemical compounds with at least two reactive groups in each molecule.

A yet more specific object of the invention is to provide a process and compositions for the manufacture of complex functional microgels to be used, among other things, as catalysts (activators, inhibitors), carriers for immobilization of biologically active materials, fillers for plastics, filtration aids and ultrahigh-bulking pigments.

A yet another specific object of the invention is to provide a process and compositions for synthesizing, in situ, complex functional microgels in aqueous dispersions of particulate matter, such as mineral and/or synthetic particulates and/or fibers, to flocculate said particulate matter instantaneously, indiscriminately and completely and then intrinsically cement the resultant aggregates to yield improved and novel products.

A still further object of the invention is to provide a process and compositions for synthesizing, in-situ, complex functional microgels in aqueous dispersions of particulate matter to impart an intrinsic, dual steric matrix of hydrophilic and organophilic sites to the resultant aggregate formations, thus rendering them compatible with (wettable by) both polar and nonpolar media.

SUMMARY OF THE INVENTION

The present invention relates to complex (multicomponent) functional microgels (characterized by rapid, virtually instantaneous, formation kinetics) synthesized in aqueous media, such as plain water or dispersions of particulate matter in water, by a process comprising the steps of (a) blending separately prepared aqueous solutions of (i) at least one reagent selected from the group consisting of alkali-metal silicates and quaternary ammonium silicates; and (ii) at least one reagent selected from the group consisting of alkali-metal aluminates and alkali-metal zincates; to form, in situ, a transient, chemically reactive subcolloidal hydrosol; and (b) blending an aqueous solution of at least one cross-linking agent, selected from the group consisting of bivalent and multivalent inorganic salts and organic, cationically active chemical compounds with at least two reactive groups in each molecule, with the system resulting from step (a) to chemically cross-link said subcolloidal hydrosol and form, virtually instantaneously, a complex (multicomponent) functional microgel.

The ratio of the reagents of (i) to the reagents of (ii) in step (a) can range from 1:10 to 10:1, by weight, a ratio of 1:1, by weight, being both suitable and preferred for many practical applications. The preferred concentration of said reagents of (i) in the reaction medium is from 0.05% to 2.0%, by weight, but with special precautions (to be discussed hereinafter) the latter concentration can be increased to 2.5%, by weight, the identical numbers applying also to the concentration of said reagents of (ii).

The bivalent (multivalent) inorganic and/or organic, cationically active cross-linking agents from step (b) are employed in the reaction medium at a concentration of up to 5%, by weight, their ratio to the transient, anionically active subcolloidal hydrosols from step (a) ranging from 1:10 to 10:1, by weight, with a ratio of 1:1, by weight, being both suitable and preferred for many practical applications. If both inorganic and organic cross-linking agents are employed simultaneously, the preferred content of organic matter (derived from the organic cross-linking agents) built chemically into the resultant hybrid, complex microgels is from 0.001% to 5.0%, by weight.

DESCRIPTION OF THE PREFERRED EMBODIMENTS

In a preferred mode of practicing the present invention, the complex functional microgels are synthesized in water to be recovered and used as novel and improved products, such as catalysts (activators, inhibitors), carriers for immobilization of biologically active materials, fillers for plastics, filtration aids and ultrahigh-bulking pigments.

In another preferred mode of practicing the present invention, the complex functional microgels are synthesized, in situ, in aqueous dispersions of particulate matter, such as mineral and/or synthetic pigmentary and subpigmentary particles and/or fibers, to manufacture improved and novel products compared to those available in the prior art.

The all-inorganic, as well as the predominantly inorganic hybrid (inorganic/organic) complex microgels, further in the specification and in the claims to follow referred to in generic terms (regardless of chemical composition) as complex microgels, or microgel cements, are formed in two distinct process stages, a different polymerization mechanism being active in each stage. Although the complex microgels under discussion are best synthesized on an industrial scale with the aid of continuous processing methods, the principles of their synthesis shall be explained in the following discussion on the example of a relatively easy-to-follow batch process, carried out in a stirrer-equipped vessel.

In the first process stage, two separate reagent solutions are introduced into a vessel containing plain water or, alternately, an aqueous dispersion (furnish) of particulate matter. One of the above reagent solutions contains an alkali-metal or quaternary ammonium silicate, preferably sodium silicate. The other solution contains an alkali-metal aluminate, alkali-metal zincate or a blend thereof in any proportions, preferably sodium aluminate by itself. An immediately commencing addition polymerization of the above reagents leads, progressively, to the formation of sodium-silico-aluminate (zincate) dimers, trimers, tetramers and higher-rank oligomers, which can be classified functionally as polymer precursors. The latter chemically reactive anionic polymer precursors, constituting transient, continuously changing systems, remain, for a limited period, in a very specific state of solution, the scientifically appropriate term "subcolloidal hydrosols" being systematically employed herein in referring to the systems in question.

In the second process stage, an aqueous solution of at least one cross-linking reagent, selected from the group consisting of bivalent and multivalent inorganic salts and organic, cationically active chemical compounds with at least two reactive groups in each molecule, is introduced into the aqueous medium (plain water or dispersion of particulate matter in water) containing the subcolloidal hydrosols formed in the first process stage. The polycondensation taking place between the chemically reactive subcolloidal sodium-silico-aluminate (zincate) hydrosols and cationic cross-linking agents leads to an ultrarapid formation of complex microgels made up of networks of macromolecules of a polymer-polycondensate type.

It should be emphasized that the primary reagents used in the first stage of the process of the synthesis of complex microgels, i.e., sodium silicate and sodium aluminate (zincate), must first react with each other to form the transient, chemically reactive subcolloidal sodium-silico-aluminate (zincate) hydrosols before any complex microgels can be formed (in the second stage of the process) by cross-linking these subcolloidal hydrosols with bivalent (multivalent) inorganic salts and/or organic, cationically active chemical compounds with at least two reactive groups in each molecule. Accordingly, the chemically reactive subcolloidal sodium-silico-aluminate (zincate) hydrosols which, along with the inorganic and/or organic cross-linking agents, are the factual microgel-forming reagents, must be considered as higher-rank reagents synthesized, in situ, from the primary reagents, i.e., sodium silicate and sodium aluminate (zincate). If the latter individual reagents reacted directly (on their own) with a cross-linking agent, such as a water-soluble salt of calcium, the products of such reactions would be merely suspensions, or precipitates, of solid, more or less crystalline particles of calcium silicate and calcium aluminate (zincate), respectively, but not microgels, let alone complex microgels, which, by definition, must contain at least three different chemical building blocks in their macromolecular make-up.

The complex functional microgels used in practicing the present invention are formed in the above-mentioned second stage of the process in a virtually instantaneous manner. It is estimated that the chemical reaction of polycondensation between the transient, chemically reactive, low-molecular-weight subcolloidal hydrosols (anionic polymer precursors) and the cationic cross-linking agents occurs in less than one microsecond. The colloidal consequences of this polycondensation are manifested in a very rapid propagation of association between the resultant all-inorganic, or hybrid, inorganic/organic, polymer-polycondensate macromolecules making up the complex microgels under discussion, bringing about, within a couple of milliseconds, the development of colloidal formations with useful molecular weights that may reach billions. It is primarily this rapid continuous growth of the molecular weights across such an enormously broad range, "sweeping" through the entire reaction space, which is deemed responsible for the instantaneous, indiscriminate and complete flocculating action of the complex microgels of the present invention synthesized, in situ, in aqueous dispersions of particulate matter. Indeed, in extensive trials no colloidal systems were ever encountered able to resist the instantaneous, indiscriminate and complete flocculating action of the in-situ-synthesized complex functional microgels of the present invention, regardless of these systems' physical, chemical or colloidal make-up.

While the complex (multicomponent) microgels used in practicing the present invention were hitherto completely unknown, the transient, chemically reactive subcolloidal hydrosols employed in the synthesis of above microgels need some elaboration to distinguish them from other, deceptively similar, systems of the prior art. In view of the confusion and lack of standardization in the present colloid-chemical terminology, a fundamental treatment of the subject matter of the present invention and a brief chronological review of the related prior art is deemed necessary.

It is essential to point out in the above context that the era of an intense worldwide interest in natural and synthetic silica and silico-aluminate materials commenced with the key discoveries of 1) water-soluble sodium silicates ("water glass") by Johann Nepomuk von Fuchs (1774–1856), who also suggested numerous practical applications for these interesting chemicals pertaining, for example, to the formulation of adhesives, cements, flame retardants for paints, detergents, soap builders, dyeing adjuvants, metal fluxes and fertilizers;

2) metallic aluminum in 1825 by Oerstedt and Wöehler, with most of the inorganic chemical compounds of this element known today having been described in the professional literature by countless scientists within the next few decades; and 3) ion-exchange properties of soils, which are natural alumino-silicates, by J. T. Way in 1850.

The rapidly following discoveries of many other commercially valuable properties of silica and alumino-silicate minerals, e.g., in the application to the desiccation of gases, clarification of water, removal of color impurities from edible and mineral oils, or manufacture of pigments and catalysts, triggered intensive research efforts in the field of silica and alumino-silicates. These efforts were directed both towards improving the performance properties of naturally occurring materials as well as producing analogous or yet unknown synthetic materials with yet more improved or even entirely novel properties.

Due to the similar dimensions of ionic radii of $Si^{4+}$ and $Al^{3+}$ (0.41 | and 0.50 Å, respectively) as well as an overwhelming abundance of these two elements in the lithosphere, a great number of alumino-silicate minerals have been synthesized in nature by geochemical processes. In contrast, the more complex (comprising three or more components) minerals related to alumino-silicates, exemplified by the previously-mentioned calcium-silico-aluminates, are relatively uncommon in nature. The reason for the rare occurrence of calcium-silico-aluminate minerals, such as margarite, $CaAl_2[Al_2Si_2O_{10}][OH]_2$, or anorthite, $Ca[Al_2Si_2O_8]$, is readily understood considering that $Ca^{++}$, with an ionic radius of 0.99 Å, is rather strongly rejected from an evolving alumino-silicate matrix, making the formation of such complex materials by geochemical processes difficult. Since calcium-silico-aluminates, found mainly as low-level admixtures in deposits of alumino-silicates, have thus far not found any significant practical applications (their sporadic use as ornamental cladding stones or semiprecious gem stones notwithstanding), the latter materials have created little interest from the standpoint of industrial or academic research. All yet more complex microgels of the present invention, such as those comprising more than three components or those of a hybrid inorganic/organic type, have absolutely no known chemical counterparts either in terms of minerals or man-made materials.

Because of diversified commercial applications, great numbers of alumino-silicate preparations and products have been synthesized during the past 150 years. That such an enormous variety of alumino-silicates, characterized by quantitatively distinct chemical compositions as well as distinct physical and colloid-chemical properties, can be synthesized from just a simple sodium silicate or silicic acid, used alone or in combination with sodium aluminate or alum, has no precedent in the inorganic chemistry. The thousands of patents issued for a broad variety of synthetic silica and alumino-silicate products, obtained with the aid of the above-mentioned reagents, relate essentially to only three principal colloidal systems, namely, continuous gels, discrete sols and precipitates.

The incredible diversification of the forms and properties of products synthesized with the aid of the same few reagents may be explained by accepting the hypothesis that colloids are the lowest-rank systems known in nature equipped with "memory." It is the latter which makes the colloids "remember" their history in chronological detail and react accordingly, as manifested in terms of their resultant material properties and functional behavior. Hence, any intentional, or even accidental, deviation from an established synthesis procedure or reaction conditions will bring about inescapably certain differences, mostly quantitative but sometimes profoundly qualitative, in the constitution and/or functional properties of the resultant colloidal systems. Indeed, the thousands of similar, or even virtually identical, patented synthetic silica and alumino-silicate products differ among each other merely with respect to relatively minor quantitative compositional variations, procedural modifications (such as pertain to the rates, orders of addition and concentrations of reagents, pH, as well as thermal and aging regimes), or with respect to the resultant products' modified physical and physicochemical properties or new areas of application.

How even a minor procedural difference may be decisive to the very usefulness of a synthetic aluminosilicate product may be illustrated, for example, by U.S. Pat. No. 2,757,085 to Paquin. As disclosed therein, satisfactory color-reactive alumino-silicate pigments, synthesized in situ in a papermaking furnish, were possible to obtain only if sodium aluminate was introduced into the furnish first, followed by the addition of sodium silicate, but not vice-versa. In a similar fashion, U.S. Pat. No. 4,213,874 to Williams et al. teaches that satisfactory amorphous sodium-alumino-silicate base exchange materials were possible to synthesize only if, among other things, the proper sequence and rate of addition of the reactants were maintained during the precipitation process.

The critical dependence of a successful preparation of colloidal systems on maintaining strictly defined process parameters and conditions is perhaps best summarized by S. Voyutsky in his textbook of COLLOID CHEMISTRY (Page 269, second paragraph), Mir Publishers, Moscow, translated into English in 1978:

"Colloidal systems can be obtained by various chemical reactions: exchange, reduction, oxidation, hydrolysis, and so forth. But colloidal systems are not always formed in reactions capable of producing sols; they are formed only (underlining added by the applicant) at definite concentrations of the initial substances, at definite order of their mixing and temperature, and when some other conditions are met."

The preferred transient, chemically reactive subcolloidal hydrosols for practicing the present invention are formed spontaneously upon blending of appropriately dilute aqueous solutions of sodium silicate and sodium aluminate. As the result of an immediately commencing addition polymerization, dimers, trimers and higher-rank oligomers (polymer precursors) evolve sequentially and continuously into very-low-molecular-weight sodium-silico-aluminate macromolecules of an anionic polyelectrolyte type. Due to the moderate concentrations of the reagents employed, but mainly due to the prompt cross-linking of the transient subcolloidal hydrosols (terminating their further molecular-weight growth), the evolving sodium-silico-aluminate macromolecules are very small, their estimated dimensions being only slightly larger than 1 nm (10 Å).

Such highly disperse systems represent special borderline solutions classified dimensionally above solutions of crystalloids (simple molecules or ions), but below colloidal solutions, e.g., those of starch, protein or polyacrylamides. A scientifically appropriate term "subcolloidal hydrosols" has been systematically used herein in referring to the above systems, which should be distinguished from aquasols (hydrosols) of the prior art representing aqueous suspensions of solid particles with diameters of from about 5 nm to 100–200 nm.

Historically, the terminology used in colloid science and technology evolved in connection with the basic investigative tools available at the inception of colloid research, namely, the conventional light microscope and ultramicroscope. The old-fashioned light microscopes, equipped with low-aperture objectives, could hardly resolve particles smaller than 200 nm in diameter; hence, such particles were referred to as "submicroscopic." On the other hand, ultramicroscopes, utilizing the Tyndall effect, made it possible to observe, though not resolve, particles as small as 5 nm in diameter. Hence, colloidal systems became traditionally the domain of ultramicroscopical investigations, and their classification as "ultramicroscopic," with particle dimensions ranging from 5 nm to 200 nm, still has a great deal of validity for most practical applications. Regrettably, some less rigorous colloid textbooks still routinely specify the colloidal dimensions extending from 1 nm to 500 nm, or even 1000 nm (1 μm).

Modern scientific research has established unequivocally, however, that the traditional delineation between "colloidal" and "noncolloidal" (crystalloid) systems, established solely on the basis of the dimensions of particles of the disperse phase, has no scientific foundation. Hence, contemporary scientific doctrines refute the concept of "colloids" and "crystalloids," interpreted in the past in a rather absolute sense, accepting instead the existence of a very specific "colloidal state" associated with disperse systems conforming to the established criteria of "colloid-like" behavior. The reasons for this can be illustrated rather clearly using the example of sodium chloride which behaves as a typical crystalloid in aqueous solutions and a typical colloid in benzene solutions, numerous other such systems already having been identified.

Many experimental findings made during the studies of extremely disperse systems attest particularly clearly to the uniqueness of the particle-dimension interval extending from 1 to 5 nm (10–50 Å), in which the colloidal and crystalloid states overlap and deficiencies of the imperfect colloid-chemical nomenclature are most evident. Hence, an unambiguous treatment of disperse systems of the above type frequently makes defining them in fundamental terms virtually mandatory, as has been established in dealing with many extremely important media, such as surfactants, dyes, toxins and antitoxins. For example, the dimensions of individual molecules of some of the above-mentioned materials are larger than 1 nm (10 Å), considered as the conventional upper limit of crystalloid particles, but smaller than 5 nm (50 Å), considered as a practical lower limit for typical colloidal particles. Since the behavior of such systems overlaps the domains of both crystalloids and colloids, some authors have introduced the rather artificial term "semicolloids" to deal with these unusual solutions. Still other authors refer to such highly disperse systems, with particle dimensions of from 1 nm to 5 nm, as "amicrons" (subcolloids), as distinguished from "submicrons," applying to typical colloidal systems with particles larger than 5 nm in diameter.

Perhaps the most unfortunate aspect of the traditional colloid-chemical terminology is that the term "aquasol," and the equivalent term "hydrosol," in which the suffix "sol" stands for "solution," are used in referring to suspensions of ultramicroscopic solid particles in water. Although aquasols (hydrosols) do indeed appear as translucent (opalescent) solutions to an unaided eye, the latter, fundamentally incorrect terms complicate the clarity of the issue when the scientific discourse revolves around boundary systems of overlapping behavior (crystalloid/subcolloid or subcolloid/colloid) or extends beyond professional circles. It should be pointed out, though, that many rigorous colloid scientists systematically employ the scientifically far more correct term "suspensoids" in referring to aquasols (hydrosols) of the prior art.

The above-mentioned, nomenclature-related problems become yet more complicated in dealing with novel subject matter, such as the subcolloidal sodium-silico-aluminate or similar hydrosols used to synthesize the complex microgels of the present invention. The latter subcolloidal hydrosols constitute borderline solutions of transient, chemically reactive polyanionic molecules. As solutions, they have the appearance of completely clear, plain water, are totally devoid of any solid particles and do not exhibit the Tyndall effect.

The transient character of these continuously changing subcolloidal sodium-silico-aluminate and similar hydrosols renders the underlying oligomers and macromolecules fundamentally undefinable in terms of the exact physical dimensions or chemical composition. This is understood best when considering that the reaction of addition polymerization, commencing with the moment the solutions of sodium silicate and sodium aluminate become introduced into the reaction space, proceeds continuously. Hence, even if there were a method capable of determining, at any given instant, the dimensions, molecular weights, or chemical composition of the evolving macromolecules, such information would become obsolete in the very subsequent instant.

It is possible, however, to objectively define the unique systems mentioned above, employing criteria of the philosophy of science used in formulating scientific definitions. According to these criteria, the continuously changing, transient, subcolloidal hydrosols cannot be classified as "materials" in a conventional sense in that they have no definite (fixed) form, mass, or properties by which a material is conventionally described or defined, e.g., in textbooks of material science. Instead, the latter systems containing solute subcolloidal sodium-silico-aluminate or similar macromolecules, representing a very specific "material state," can be defined in terms of (a) detailed description of the reaction medium and conditions at the onset of the synthesis of the subcolloidal hydrosols in question, i.e., at the point of time (t) where t=0; and (b) an arbitrary subsequent point of time (t=x).

The latter means that if the synthesis of an arbitrary transient subcolloidal hydrosol is initiated at a time t=0, using identical reagents, reagent proportions and concentrations, sequences and rates of reagent addition, temperature, pH and all other effective reaction conditions and process parameters, then, and only then, the resultant transient subcolloidal hydrosol will be exactly the same each time when passing through a subsequent fixed point of time t=c (c=x).

While the above-discussed, continuously evolving (in statu nascendi) subcolloidal systems, e.g.,sodium-silico-aluminates, are undefinable in conventional material terms, it is also unquestionable that they are different from any existing natural or synthetic substances of the same nominal chemical composition. By contrast, all sols known in the prior art are classified as phaseal colloids, the latter term indicating that the disperse phase is identical to an analogous phase existing on a macro scale and, in principle, could be obtained from the latter with the aid of mechanical comminution or other preparatory methods.

The transient aspects of the subcolloidal sodium-silico-aluminate hydrosols used in practicing the present invention must be particularly strongly emphasized since the process of addition polymerization between sodium silicate and sodium aluminate is a continuous one. Hence, at some advanced stage of polymerization (aging), the solute particles of the above-mentioned subcolloidal hydrosols acquire sufficiently high molecular weights to exceed solubility limits, whereupon the subcolloidal hydrosols transform into conventional (prior-art) aquasols, i.e., colloidal suspensions of solid particles. The period of aging necessary to initiate such a transformation may extend from less than a second up to several days, or even weeks or months, depending on the concentration of sodium silicate and sodium aluminate (zincate) in the reaction medium, and is manifested by the appearance of the Tyndall effect.

As is understood by those skilled in the art, the chemical reactivity of the subcolloidal hydrosols in question, i.e., the ability to form complex microgels by a process of chemical cross-linking carried out with the aid of bivalent and/or multivalent inorganic salts and/or organic, cationically active agents decays with the increasing degree of polymerization (aging). The chemical reactivity is lost essentially completely when the solute particles of the above subcolloidal hydrosols polymerize beyond the solubility limits, transforming into solid colloidal particles typical of conventional sols. It is important, therefore, that the second stage of the synthesis of complex microgels, in which the latter subcolloidal hydrosols become chemically cross-linked with the aid of cationic agents, be carried out before the advent of the Tyndall effect.

In a standard industrial practice, the useful life span of the transient, chemically reactive subcolloidal hydrosols used for the synthesis of complex microgels in plain water with the aid of high-throughput continuous reactors should extend for at least a couple of seconds. With subcolloidal hydrosols to be employed for an in-situ synthesis of analogous complex microgels in dispersions of particulate matter, the corresponding life span should extend preferably for about 20–120 seconds. The need for an increased useful life span is associated with the fact that aqueous dispersions of particulate matter, often considerably more viscous than plain-water media, are usually more difficult to mix and convey through continuous reactors.

The ultrarapid, virtually instantaneous formation kinetics of the complex microgels of the present invention has no parallel in the synthesis of even much simpler (monocomponent or bicomponent) silica-based colloids. The latter is clearly illustrated, e.g., by a typical batch-process synthesis of simple bicomponent alumino-silicates disclosed (col. 6, lines 25-57) in U.S. Pat. No. 2,974,108 to Alexander (Example I). Using a combined reactor capacity of at least 4 liters, about 8–10 hours were needed in the example in question to prepare 26 g (active basis) of a silico-aluminate product (six hours alone were spent for dispensing the reagent solutions into the reactor at a rate of 200 ml per hour). The aquasol preparation involved the following steps:

(a) dispensing separate solutions of silicic acid and sodium aluminate into a preheated dilute solution of sodium hydroxide, maintaining the reaction temperature at 95° C.;

(b) cooling the system resulting from step (a);

(c) deionizing the system from step (b) until a pH value of 7.5 was reached;

(d) concentrating the system from step (c) from the original volume of 3.9 liter to 1.0 liter;

(e) deionizing the system from step (d) until the final pH value of 7.5 was again reached; and (f) additionally concentrating the system from step (e) to a final weight of 270 g.

The resultant product was described as a "stable, sodium alumino-silicate sol" (colloidal dispersion of solid particles in water), whose solid phase had a silica-to-alumina ratio of 11.5:1.

By comparison, 7 to 8 tons (dry basis) of a complex microgel product, e.g., of a calcium-silico-aluminate type, can be synthesized with the aid of an equivalent continuous reactor (having the same combined capacity as the batch reactors employed by Alexander) during the time period spent in the above-mentioned example to prepare 26 g (dry basis) of an alumino-silicate aquasol. The calculated effective throughput efficiency of the complex-microgel process of the present invention (defined in terms of weight-units of product per unit of time per unit of reactor volume) is thus 200,000 to 300,000 times higher than that attained by Alexander.

It should further be borne in mind that the throughput efficiency of Alexander's process is curtailed primarily by its inherently slow kinetics as well as by its cumbersome, multistage character. Moreover, as is well known to those skilled in the art, scaled-up industrial-size batch reactors always have lower specific efficiencies (throughputs relative to a unit volume of reactor space) than analogous laboratory-size reactors. In contrast, the ultrafast formation of the complex microgels of the present invention "outpaces" the capabilities of even the most efficient continuous industrial reactors (the complex microgels form chemically faster than they can be mechanically conveyed through the reactors), not withstanding the fact that large continuous reactors are virtually always more efficient than analogous smaller ones. Hence, as indicated by preliminary calculations, the complex microgels under discussion could be produced on a large scale at throughput efficiencies that are millions times higher than those feasible with the aid of Alexander's batch process.

It should be pointed out in the above context that other processes typically employed for the preparation of alumino-silicate-based colloidal products, such as those disclosed in U.S. Pat. No. 4,217,240 to Bergna in U.S. Pat. No. 3,726,700 to Wildt or in U.S. Pat. 4,247,420 to Dumoulin et al.; are in some respects even more cumbersome, more protracted and slower than those employed by Alexander.

As is typical of ultrafast chemical reactions in aqueous media, the in-situ formation of complex functional microgels of the present invention is practically independent of the temperature of the reaction medium. The above microgels can thus be formed, in principle, within the entire temperature interval in which water remains fluid, provided that the stability of the reagents is not affected at elevated reaction temperatures. A special consideration, for example, should be given to the limited thermal stability of solutions of sodium aluminate. The virtually temperature-independent synthesis of the complex microgels of the present invention radically contrasts with the synthesis of virtually all silica- and alumino-silicate-based colloidal systems known in the prior art, requiring a rigorous observance of prescribed thermal regimes.

The following example demonstrates a laboratory batch process for synthesizing, in plain water, a calcium-silico-aluminate microgel representing one of the simplest complex (multicomponent) microgels of the present invention.

EXAMPLE I

Distilled water, in the amount of 120 g, was placed in a transparent plastic beaker with a capacity of 400 ml, provided with a high-lift stirrer operated by a high-torque, variable-speed drill press. The rotational speed of the stirrer was adjusted so as to generate the largest possible vortex while safely containing the water in the beaker.

The first stage of microgel synthesis was carried out by simultaneously injecting 20 g of a 5%-solids aqueous solution of sodium silicate (Brand "N"—clear grade, by Philadelphia Quartz Co.) and 20 g of a 5%-solids aqueous solution of sodium aluminate into the vortex of the above-mentioned body of distilled water, using plastic syringes positioned at diametrically opposite sides of the beaker (to avoid a direct contact between ejecting streams of concentrated reagent solutions before they become sufficiently diluted by the main body of water). The entire double injection can be performed safely in a fraction of a second due to the intensive homogenization of the reaction medium provided by high-vortex stirring.

The immediately commencing polymerization process between sodium silicate and sodium aluminate molecules leads to a progressive formation of sodium-silico-aluminate monomers, dimers, trimers, tetramers and higher-rank oligomers, the dimensions of the continuously growing macromolecules more or less quickly exceeding the conventional 10 Å limit of crystalloid solutions. As a consequence, the system becomes for a limited period of time (until the advent of the Tyndall effect) a very special solution of sodium-silico-aluminate macromolecules, i.e., subcolloidal hydrosol, in which particles of the disperse phase are larger than those of crystalloid solutions but smaller than the 50 Å-or-larger particles of conventional colloidal systems. As was previously explained, the physicochemical properties of subcolloidal hydrosols are significantly different from those of either crystalloids or colloids.

In the second stage of the process, a 5%-solids solution of calcium chloride in the amount of 40 g was injected into the vortex of the agitated transient (in situ nascendi) subcolloidal hydrosol, causing a lightning-fast, virtually instantaneous cross-linking of the latter by a chemical reaction of polycondensation. The principal end product of the polycondensation was a calcium-silico-aluminate microgel, the by-product being sodium chloride.

The microgel slurry from the above example was filtered through a Buechner funnel lined with a fast-filtering paper. The resultant filtercake was rinsed with distilled water and dried at 95° C., fusing into a solid disc resembling a continuous gel with no discernible grain boundaries.

The dry-product yield was assessed at about 63% in relation to the dry weight of the reagents (sodium silicate, sodium aluminate and calcium chloride) employed in synthesizing the above microgel. A subsequent calcining of the dried filtercake at a temperature of about 1000° C. reduced the above yield to about 50% in relation to the dry weight of the reagents employed, which indicates that, after drying at a temperature of 95° C., the complex microgel in question still contained approximately 20%, by weight, hydroxyl groups.

A chemical analysis of the crystal-clear filtrate from Example I revealed a residual concentration of unreacted silicon and aluminum ions on the order of a couple of parts per million, along with about one-third of unreacted calcium chloride (employed purposely in an excess of about 50%, by weight). By varying the weight-ratio of sodium silicate to sodium aluminate from 1:10 to 10:1, it was established that the yield of calcium-silico-aluminate microgel samples synthesized in accordance with the procedure specified in Example I can be slightly lower than 63%, by weight. It was also established that the corresponding concentrations of residual (unreacted) silicon and aluminum ions increased in some cases to 10, or even more, parts per million. The residual concentrations of unreacted silicon and aluminum ions were found to increase even more, e.g., to 15 or even 20 parts per million when the above-mentioned excess of the calcium cross-linking salt was reduced below 50%, by weight.

It should also be pointed out that the above-mentioned complex-microgel yields apply only to Brand "N" sodium silicate by Philadelphia Quartz co., containing 28.7% $SiO_2$, by weight. As is readily understood, other commercial brands, having different $SiO_2$ contents, will provide different microgel yields.

The colloidal properties of the complex microgels of the present invention can be understood more clearly from the example to follow.

EXAMPLE II

A sample of a calcium-silico-aluminate microgel was prepared using the same reagents, reagents proportions and procedures as those specified in Example I. The resultant complex-microgel slurry was divided into two portions, to be transferred into separate transparent plastic containers. One of the containers was used to conduct long-term visual observations of the slurry under static conditions, the other one being used for analogous observations under dynamic conditions involving a continuous stirring of the slurry.

After 24 hours of aging under static conditions, the layer of crystal-clear supernatant was merely a couple of millimeters thick and increased only marginally within the next couple of weeks. The latter is clearly indicative of the enormously high bulking properties of the evaluated complex microgel, particularly in view of the fact that the concentration of microgel in the above-mentioned slurry was less than 1.3%, by weight. The applicant is not aware of any other wholly inorganic particulate material known in the prior art that would even remotely approach the unusually highly pronounced bulking properties of the complex microgels of the present invention.

Minisamples of both of the above complex-microgel slurries were drawn at periodic intervals with the aid of an eyedropper and dispersed in distilled water, using hand stirring with a spatula. Systematic visual observations, extending for over three weeks, revealed no perceptible particle-size change with either of the above complex-microgel samples, regardless of whether the latter were stored under static or dynamic conditions. The particle size of both above microgel slurries did not change perceptibly also when, after a few weeks of aging, the slurries were filtered, rinsed and then immediately redispersed in water with the aid of high-shear agitation.

Since the resultant dense slurries of complex microgels synthesized at the relatively high reagent concentrations used in Examples I and II obscure visual observation of certain aspects of colloidal behavior of such slurries, an identical complex microgel was synthesized under considerably more dilute conditions in the example to follow.

EXAMPLE III

A sample of a calcium-silico-aluminate microgel was synthesized with the aid of the procedure described in Example I, the reagent concentrations employed being correspondingly 20 times lower. The concentration of complex-microgel in the resultant dilute slurry was slightly below 0.07%, by weight.

The instantly formed microgel particles were extremely fine, but a progressive particle growth became clearly noticeable within a few seconds when the reaction medium was either at rest or was agitated very slowly. After the agitation of the medium was discontinued completely, the entire disperse phase settled to the bottom of the beaker after a couple of minutes in the form of a moderately thin, very fluffy layer under a pool of a crystal-clear supernatant.

The original state of dispersion of the complex microgel under discussion could easily be restored, as visually assessed, by stirring the system with the aid of a spatula. The cycle of progressive particle growth and settling, setting in again each time the agitation of the system was discontinued, could be repeated countless numbers of times with dilute slurries of the freshly synthesized complex microgels without any permanent particle enlargement or other signs of irreversible aging being noticeable.

It is also worth noting that the bulking characteristics of the dilute complex-microgel slurry from this example was even more pronounced than those of the considerably more concentrated microgel slurries prepared in Examples I and II.

To demonstrate the flexibility of the process for synthesizing the complex microgels of the present invention, the duration of time interval between the moment the solutions of sodium silicate and sodium aluminate were blended to initiate the formation of a chemically reactive subcolloidal hydrosol and the moment of hydrosol cross-linking by calcium ions was arbitrarily varied in the preceding examples between about one-tenth of one second and two minutes. Since the formation of the complex microgels under discussion is not stoichiometric, the above-mentioned time interval, once selected, must be rigorously maintained to always reproducibly synthesize identical microgel products (all other process parameters and conditions also being rigorously maintained, of course). As is readily understood, the complex microgels can be synthesized at significantly higher reagent concentrations, thus increasing the throughput efficiency for a fixed reactor capacity, when the interval between the formation and cross-linking of the subcolloidal hydrosols is kept to a minimum.

The practically feasible limits of concentrations of subcolloidal-hydrosol-forming reagents in the reaction medium were assessed by blending aqueous solutions of sodium silicate and sodium aluminate prepared at various solids levels. For example, a pronounced Tyndall effect became noticeable in about one second after blending 5%-solids solutions of sodium silicate and sodium aluminate. The latter clearly shows that the evolving subcolloidal solution of the chemically reactive (sodium-silico-aluminate) monomers, dimers, trimers and higher-rank oligomers rapidly transforms at the above-mentioned reagent concentration into a conventional colloidal dispersion of significantly larger, insoluble, chemically nonreactive, solid alumino-silicate particles, corresponding to prior-art aquasols or precipitates, which are completely useless for practicing the present invention. As a matter of fact, the entire above-mentioned system transformed into a continuous solid gel within only a few seconds.

As was established in extensive trials, sodium silicate and sodium aluminate can be employed in the reaction medium at a maximum concentration of about 2–2.5%, by weight, provided that the cross-linking operation can be successfully carried out within a period of a couple of seconds. The latter can be accomplished only, however, when the reaction medium is not too viscous and a specially designed train of very powerful continuous reactors is simultaneously employed.

The lower limit of concentrations of solutions of sodium silicate and sodium aluminate in the reaction medium, useful in practicing the present invention, was established to be about 0.05–0.1%, by weight. Although the Tyndall effect is not noticeable even after 24 hours with such low concentrations of the above-mentioned reagents, it is preferable for the sake of process economy to limit the duration of time interval between the formation and cross-linking of the subcolloidal hydrosols in large-scale manufacturing operations to less than 1 or 2 minutes, preferably to less than 20–30 seconds.

The foregoing discussion makes it now possible to define more clearly the objective meaning of the term microgels, in general, and complex microgels of the present invention, in particular. For example, THE CHEMISTRY OF SILICA—Solubility, Polymerization, Colloid and Surface Properties, and Biochemistry by Ralph K. Iler, (Copyright 1979 by John Wiley & Sons, Inc.; Library of Congress QD181.S6144 546'.683'2 78-23960 ISBN 0-471-02404-X), based on more than 2,600 references, teaches that the term "microgels" originated more than seventy years ago (see page 225 for reference to Usher, Proc. R. Soc. London, A125, 143, 1929). According to the microgel-formation mechanisms proposed in the above monograph, presented here in great simplification, the polymerizing silica particles begin, after attaining a certain stage of polymerization, to aggregate into chains. The chains hook up subsequently into particulate three-dimensional formations, called silica microgels (microgel region), which hook up further into extensive networks to form continuous silica gels. The formation of the above silica microgels is recognized to be only a transient stage in the ongoing process of formation of continuous silica gels. It is thus obvious that silica microgels, or any other microgels for that matter, cannot permanently exist on their own. As a matter of fact, a continuous silica gel will form invariably in only a portion of the space occupied by the original silica solution (system), coexisting in equilibrium with a dilute silica solution occupying the remainder of the space, when the concentration of silica microgel in the system is insufficient to form an extensive (continuous) "wall-to-wall," "top-to-bottom" gel.

It is worth noting that the concept of microgels forming as transient spatial arrangements of macromolecules is universally inherent to a scientific-philosophical interpretation of the formation of continuous gels as physicochemical processes. The latter is obvious in that even the fastest such processes occur gradually rather than truly instantaneously (a truly instantaneous process, of course, would have to occur within a hypothetical infinitely short period of time). Consequently, all consolidating (gelling) systems invariably pass through an intermittent stage of transient-microgel formation before the final continuous-gel structure becomes established, be it a silica gel, tapioca pudding or a gelled chicken bouillon. It is thus critical to emphasize that the transient, continuously changing silica microgels, known in the prior art, are not products in the conventional sense, i.e., stable, permanent items, or final results of a manufacturing operation, conforming to accepted definitions of products used in textbooks of material science or in dictionaries.

To be correctly called microgels, the latter must be possible to manufacture as stable end products in the form of micron- or submicron-sized gel particles. As is known from colloidal science, however, the only gelling processes known are those which lead, through a continuous train of colloidal events, to the formation of continuous gels. Accepting the existence of some hypothetical "microgelling" processes would obviously also necessitate identifying some yet unknown programmed forces, set forth to locally (on a microscale) terminate the process of gelling at some arbitrary stage to form microgels as the permanent end products.

Unlike the continuously changing silica microgels recognized in the prior art as purely transient formations, the complex microgels of the present invention are full-fledged products having all aspects of permanency required of a product, as such. The fundamental colloidal mechanism at the foundation of the complex microgels under discussion is obviously the same as the one responsible for the formation of continuous gels. However, because of the ultrarapid (for all practical purposes instantaneous) cross-linking (polycondensation) of the chemically reactive polyanionic hydrosols by bivalent (multivalent) cross-linking agents, the rapidly generated gelling material is unable to develop into a continuous formation by the inherently slow gelling process and breaks up locally, in an implosive fashion, into a particulate gel (microgel).

The implosion model of complex-microgel formation may be best understood by visualizing the reaction space as divided into imaginary cells. The entire, virtually instantaneously formed, disperse phase (consisting of avalanche-like evolving polymer-polycondensate macromolecules, such as the calcium-silico-aluminates mentioned previously) contained in each of these imaginary cells flocks implosively toward the center of the cell, resulting in the formation of individual microgel particles (flocs). The latter, lightning-fast-formed flocs become instantly enveloped by a clear aqueous phase containing only the dissolved by-products of the polycondensation reaction, such as $NaCl$, $NaNO_3$ or $Na_2SO_4$, and unreacted, excess cross-linking salts.

As demonstrated in Example I, freshly formed, highly hydroxylated calcium-silico-aluminate microgel, which is an excellent hydraulic cement in its own right, can be "fused" into a continuous gel upon filtration and drying (dehydroxylation) of the compacted filtercake at elevated temperatures. On the other hand, as demonstrated in Examples II and III, the complex microgels permanently retain particulate constitution when left in the disperse state or when a freshly formed filtercake is redispersed within a reasonable period of time.

The latitude of pH conditions under which it is possible to form the complex microgels of the present invention is illustrated below by comparing the synthesis of calcium-silico-aluminate and aluminum-silico-aluminate microgels.

EXAMPLE IV

A sample of a calcium-silico-aluminate microgel was prepared in the manner described in Example I. The aqueous slurry of the freshly synthesized complex microgel had a pH of 10.8. The identical procedure was also employed to prepare a sample of another complex microgel, using aluminum sulfate instead of calcium chloride as the cross-linking reagent. The aqueous slurry of the resultant aluminum-silico-aluminate microgel had a pH of 8.8.

No perceptible visual differences in the formation of both above microgel samples were noted during their synthesis.

It should be pointed out in terms of general information that the pH of the 5%-solids solution of sodium silicate (Brand "N" by Philadelphia Quartz) was 11.3 whereas the pH of the 5%-solids solution of (reagent-grade) sodium aluminate was 12.9. The solution of calcium chloride was essentially neutral. As is readily understood, the pH of 10.8, measured in the slurry of calcium-silico-aluminate microgel, is mainly the result of a 100-fold dilution with water (as previously mentioned, the concentration of complex microgel in the slurry was less than 1.3%, by weight), the effect of the common residual acidity of distilled water due to dissolved carbon dioxide not withstanding. On the other hand, the 5%-solids solution of alum had a pH of 2.9, the resultant pH of 8.8 of the aluminum-silico-aluminate microgel slurry being largely the result of a partial neutralization of the highly alkaline sodium silicate and sodium aluminate by the strongly acidic alum.

As is readily understood by those skilled in the art, the above-described formation of an aluminum-silico-aluminate microgel at a pH of 8.8 constitutes a fundamentally new finding in view of the well-known fact that sodium silicate cannot be cross-linked by alum unless the pH in the reaction medium is lower than 5. It is thus obvious that the aluminum introduced into the microgel from the alum solution via the cross-linking (polycondensation) mechanism is different from aluminum introduced into the microgel from the transient, chemically reactive subcolloidal sodium-silico-aluminate hydrosol. Consequently, the resultant microgel is chemically not a conventional alumino-silicate but rather a novel aluminum (alumina)-silico-aluminate unknown in the prior art.

The complex microgels of the present invention can also be synthesized at pH levels lower than those indicated in Example III by acidifying beforehand the solutions of cross-linking agents with the aid of mineral or organic acids. The lowest pH levels in the reaction medium at which the complex microgels under discussion can be synthesized depend on the chemical composition of the complex microgels in question. For example, freshly formed (highly hydroxylated) calcium-silico-aluminate microgels, mentioned previously, were found to dissolve at a pH of about 3.5. Consequently, the pH of 4 may be considered for most practical purposes as the lowest pH applicable to practicing the present invention. It is worth noting, however, that calcium-silico-aluminate microgels become essentially insoluble even in dilute strong mineral acids after being cured at a temperature of about 220° C.

To establish the amount of acid needed for attaining the desired pH in the resultant microgel slurry, the latter must first be prepared under alkaline conditions, e.g., in a fashion described in Example I, and then titrated with the acid to be employed. The proportions of acid so determined must then be added to the solution of cross-linking agent(s) to be used in the complex-microgel synthesis.

In accordance with the present experience, there are virtually no limits as to how many different cross-linking agents can be employed simultaneously to synthesize the most exotic complex microgels. Various new compositions completely unknown in the prior art, such as quadruple-component microgels exemplified by calcium/aluminum-silico-aluminates, were synthesized in accordance with the present invention by simultaneously employing, in the same cross-linking solution, bivalent calcium salts in combination with alum and/or other bivalent and multivalent inorganic salts. It should be borne in mind, though, that the transient, chemically reactive subcolloidal hydrosols also offer a considerable measure of design versatility in their own right. The latter hydrosols, for example, can be synthesized from different alkali-metal and ammonium silicates, on the one hand, and alkali-metal aluminates, alone or blended in different proportions with alkali-metal zincates, on the other. Moreover, as previously pointed out, both the concentration and degree of oligomerization (affected by the duration of aging) of the transient, chemically reactive subcolloidal hydrosols present in the reaction medium at the moment of cross-linking also affect the properties of the resultant complex microgels.

The all-inorganic complex microgels of the present invention can be used, among other things, for the manufacture of novel catalysts for chemical, petrochemical, pharmaceutical or biochemical processes. For example, a great variety of catalytic (activator, inhibitor) metal-atom sites can readily be built into a principal calcium-silico-aluminate (zincate) or similar microgel matrix, the spatial distribution and spacing of these sites being induced in a statistically predetermined fashion unattainable with the aid of methods known in the prior art. The resultant microgel-based catalyst (activator, inhibitor) products can be calcined in an ambient atmosphere to obtain the necessary level of attrition resistance, or in hydrogen to reduce the built-in metal oxides to a catalytically (activator, inhibitor) active elementary metallic form.

In another practical application, the complex functional microgels of the present invention can also be used as ultra-high-bulking pigments for paper and paints. As is readily understood, however, the inorganic bivalent and multivalent cross-linking salts for making the above-mentioned pigments are generally different from those suitable for the manufacture of complex microgels for catalytic and related applications. Specifically, the inorganic cross-linking salts for making microgel-based pigments should be essentially white (colorless), nontoxic and noncorrosive and form stable solutions in water. Consequently, the selection of such cross-linking salts is restricted for all practical purposes to appropriate compounds of calcium, barium, magnesium, aluminum, zinc and zirconium. Among the preferred complex microgels for making the above-mentioned ultrahigh-bulking pigments are primarily those of calcium (and/or aluminum, magnesium)-silico-aluminate (zincate) types.

There are also many important practical applications, however, for which hybrid, inorganic/organic, complex microgels with precisely controlled lyophilic (organophilic) properties are preferable to all-inorganic ones. Such hybrid complex microgels can be manufactured readily in accordance with the present invention by employing organic, cationically active chemical compounds with at least two reactive groups in each molecule as the sole (principal) cross-linking agents. The latter organic compounds can also be employed as auxiliary cross-linking agents, combined (in the same reagent solution) with bivalent (multivalent) inorganic cross-linking salts.

The organic, cationically active chemical compounds with at least two reactive groups in each molecule, while too numerous to list, can be selected most readily from three well-defined generic groups of chemical compounds, namely, cationic surface active agents, e.g., Hyamine 2389 (methyl-dodecylbenyltrimethyl ammonium chloride-methyldodecyl-xylene bis[trimethyl ammonium chloride]); Werner complexes, e.g., Quilon M (a colorless bivalent organo-metallic complex in which a fatty acid is coordinated with aluminum); and cationic polyelectrolytes, such as polyacrylamides. It should be emphasized, though, that the surface active properties of the bivalent (multivalent) cationic surfactants mentioned above are irrelevant to their use in practicing the present invention. As a matter of fact, all such surface activity ceases to exist after the cationic surfactants used as cross-linking agents become built chemically into the macromolecules making up the hybrid complex microgels under discussion.

To render the hybrid complex microgels of the present invention compatible with organic media, e.g., for use as fillers for plastics or synthetic fibers, the organic, cationically active compounds should be added sparingly (to the extent needed to impart the desired levels of surface-chemical modification to the complex microgels in question) to the solutions of the inorganic cross-linking salts employed. The organic, cationically active chemical compounds with at least two reactive groups in each molecule can best be screened with the aid of specialized empirical methods, such as contact angle measurements, using pellets of compressed hybrid complex microgels as substrates for depositing drops of water or organic liquids used in the measurements in question. The contact-angle determinations make it possible to assess which and how much of these compounds should be used along with the inorganic cross-linking salts to modify the surface-chemical properties of the resultant hybrid complex microgels to the extent needed to render them compatible with arbitrary organic media.

According to the present findings, hybrid complex microgels containing from 0.001–0.005%, by weight, chemically bound organic constituents derived from organic, cationically active cross-linking agents already show the effects of a pronounced surface-chemical modification. A far-reaching surface-chemical modification, resulting in a dry microgels' floatability on water, can often be obtained with hybrid microgels containing less than 0.5%, by weight, organic constituents.

The use of organic, cationically active chemical compounds with at least two reactive groups in each molecule as cross-linking agents is also important in the manufacture of complex microgels for catalytic applications. For example, catalysts with precisely controlled pore dimensions can be obtained by incorporating up to 5%, by weight, organic, cationically active compounds of known molecular dimensions into the macromolecules making up the hybrid complex microgels and then removing the organic components by pyrolysis in an oxidizing atmosphere. A precise spacing of catalyst (activator, inhibitor) sites in the catalyst matrix, combined with a generation of adjacent pores with precisely controlled dimensions, can be obtained by using cationically active organometallic compounds, having both the desired metallic components and appropriate molecular dimensions, as the auxiliary cross-linking agents. A pyrolysis of the resultant hybrid complex microgels in an oxidizing atmosphere will burn out the chemically built-in organic constituents around the metal-oxide sites embedded in the catalyst matrix. A subsequent heating in a hydrogen atmosphere will reduce the metal oxides to the elementary metallic form.

Hybrid complex microgels of the present invention containing up to 5%, by weight, of organic, cationically active chemical compounds with at least two reactive groups in each molecule (employed in the microgel synthesis as either the auxiliary or principal cross-linking agents) can also be used as uniquely selective carriers for immobilization (permanent attachment) of enzymes and other biologically active materials. It is especially advantageous to synthesize hybrid microgels for the above-mentioned carrier applications using appropriately selected organic, cationically active cross-linking molecules each of which also contains at least one latent (potentially reactive) chemical group which remains unaffected by the cross-linking process but, after a subsequent chemical treatment of the hybrid microgels under discussion, becomes enabled to chemically accept and immobilize (attach) biologically active molecules. A simple example of such a latent chemical group is aldehyde, which can be converted, in situ, into a far more reactive carboxylic acid, e.g., by submitting hybrid, complex microgels containing aldehyde groups in their molecular structure to oxidation in the presence of excess free aldehyde. Alternately, the aldehyde groups can be converted into sodium-aldehyde-sulfite groups by submitting the hybrid complex microgels in question to the action of sodium sulfite. Both above aldehyde-derived groups can then be used for chemically attaching organic functional (biologically active) molecules equipped with suitable auxiliary, chemically reactive terminal groups.

Selected organic, anionically active chemical compounds with at least two reactive groups in each molecule can also be built chemically into the complex microgels of the present invention to modify the latters' surface-chemical properties. As is obvious from process considerations, the organic, anionically active chemical compounds must be incorporated into the reaction medium along with the anionically active sodium silicate and sodium aluminate (zincate), i.e., prior to the cross-linking itself. Generic classes of suitable chemical compounds encompass, among other things, surface active agents with at least two anionic groups in each molecule, exemplified by the tetrasodium salt of N-(1,2-dicarboxyethyl)-N-alkyl sulpho-succinamate (Aerosol 22 by Cyanamid); sodium salts of carboxymethyl cellulose; and sodium salts of polyacrylic acid. The latter compounds should react on their own with the cationically active inorganic and/or organic cross-linking agents to be employed, rapidly forming insoluble precipitates, which must be verified beforehand in independent tests.

It should be pointed out in the above context, however, that a certain statistically defined proportion of the organic, anionically active molecules present in the reaction medium will always fail to become built chemically into the resultant hybrid macromolecules making up the hybrid complex microgels under discussion. As is readily understood, the latter organic, anionic compounds will become built chemically into the hybrid macromolecules only when the same molecule of a bivalent (multivalent) cationic cross-linking agent attaches simultaneously both to an anionic organic molecule and to an anionically active molecule of a sodium-silico-aluminate (zincate) monomer, dimer, trimer or higher rank oligomer. The "left-out," independently cross-linked (precipitated) organic, anionic molecules then become occluded into the resultant hybrid complex microgels by way of colloidal mechanisms (flocculation). Similarly, the in-situ forming complex microgels also occlude most dissolved nonionic macromolecules present in the reaction medium.

In contrast to the organic constituents built chemically into the macromolecules making up the hybrid complex microgels under discussion, the coflocculated organic macromolecules mentioned above can be removed physically from the resultant hybrid complex microgels with the aid of solvent extraction or dialysis. The latter approach is useful particularly for a controlled generation of pores in hybrid complex microgels, without resorting to a total burnout of the organic components by way of pyrolysis. For example, hybrid complex microgels with a-priori-designed surface-chemical characteristics, pore dimensions and pore-size distribution are suitable for making specifically selective (customized) filtration media, useful in the pharmaceutical and biotechnical industries, performing similarly to natural biological membranes.

The complex functional microgels of the present invention also perform many useful functions when synthesized in situ in aqueous dispersions of particulate matter, such as slurries of pigments or furnishes for making paper and wet-laid nonwovens. The primary purpose of such in-situ-synthesized complex microgels is to induce an instantaneous, indiscriminate and complete flocculation (coflocculation) of all particulate species (disperse phases) present in the system.

As is well known to those skilled in the art, flocculation phenomena play a fundamental role in the manufacture of aggregate pigments, paper and wet-laid nonwoven products. However, the flocculation processes of the prior art are slow, selective (rather than indiscriminate) and incomplete. As a consequence, the material properties and end-use performances of many prior-art products made with the aid of the latter processes are adversely affected by a detrimental selective flocculation and fractionation of the disperse phases by species and size, taking place during these products' manufacture. An incomplete flocculation also permanently leaves intact a substantial proportion of particulate matter resistant to flocculation in the spent process water, even after the customary expensive chemical treatments and prolonged settling, endangering the integrity of many communal water systems.

An additional distinct technological advantage of using the in-situ-synthesized complex microgels under discussion is that they make it possible to freely employ many valuable disperse raw materials which, being practically immune to the flocculation processes of the prior art, could hitherto not be employed in scores of important flocculation-based processes such as papermaking, formation of wet-laid nonwovens or manufacture of aggregate pigments.

The secondary purpose of the complex functional microgels of the present invention, synthesized in situ in aqueous dispersions of particulate matter, is to impart arbitrary levels of intrinsic cementation to the resultant aggregate particulates, such as those of pigment/pigment, fiber/fiber, or fiber/pigment types. Since many of the complex microgels under discussion, particularly those of a calcium-silico-aluminate type, are outstanding hydraulic cements in their own right, an adequate interparticle bonding can be established by merely aging, for a period of from a couple of hours to a few days, the flocculated particulate slurries or the residues obtained by filtering these slurries. Hence, substantial fuel-cost savings can be realized in the manufacture of aggregate pigment products by employing the above-mentioned hydraulic curing of the in-situ synthesized complex microgel cements. Moreover, the specified particle-size distributions, routinely required with all pigment products, can be obtained economically with the aid of inexpensive high-shear agitation of fluidized (dispersed), hydraulically cured filtercakes of the aggregate pigments in question without resorting to the customary dry-state comminution, for which special, often expensive, pulverizing equipment must normally be employed.

The mechanical strength of the resultant particulate aggregates is routinely controlled by the dosage of the complex microgel cements as well as by the length of hydraulic curing or the temperature of thermal curing. Thermal curing is, of course, both faster and more complete at higher temperatures; for example, complex microgel cements of the calcium-silico-aluminate type can be virtually completely cured by heating at a temperature of about 220° C., becoming practically insoluble in dilute strong mineral acids. The curing temperatures with other, more exotic complex microgels can be either higher or lower than those mentioned above.

The mechanical strength of particulate aggregates cemented with the in-situ-synthesized complex microgels under discussion can further be increased by coflocculating water-disperse and water-soluble polymer adhesives along with the inert (nonadhesive) particulate matter. The latter inclusion of disperse adhesives is, of course, possible only due to the instantaneous, indiscriminate and complete flocculating action of the in-situ-synthesized complex microgels, the adhesives in question being essentially resistant to flocculation processes known in the prior art. It should also be pointed out that the adhesive action of complex microgel cements is possible only because the microgel particles, formed in situ in highly sheared aqueous dispersions of particulate matter, are extremely small and have an inherent deformability (prior to being cured, of course), enabling them to orient effectively in discrete, ultrathin formations embedded between the individual particles of matter to be cemented. As is readily understood by those skilled in the art, only true microgel particles, but not solid aquasol particles or precipitates, are capable of such a deformation.

The tertiary purpose of the complex microgels of the present invention, synthesized in situ in aqueous dispersions of particulate matter, is to impart various desirable material and functional properties to the aggregated and cemented particulates, important from the standpoint of the latters' end-use applications. The above-mentioned effects can be realized through a modification of the inherent physical and/or surface-chemical properties of the complex microgels, e.g., by chemically building organic, cationically or anionically active compounds (having at least two reactive groups in each molecule) into the macromolecules making up the hybrid microgels under discussion. As a consequence, a steric matrix of discrete organophilic (hydrophobic) sites can be imparted to the aggregated particulate matter. By controlling, at will, the organophilic (hydrophobic) properties of the in-situ-synthesized hybrid complex microgels, particulate-matter aggregates can be obtained that are readily compatible with, or dispersible in, arbitrary organic media.

The in-situ-synthesized complex functional microgels can also be used to indirectly modify the functional and surface-chemical properties of the resultant particle aggregates by coflocculating, along with the principal particulates, polymer-emulsion adhesives and organic dyes, both of which are potent surface-chemical modifiers in their own right. The importance of monitoring the adhesive strength of the in-situ-synthesized hybrid complex microgel cements should again be emphasized in the above context since the latter strength deteriorates markedly with the increasing content of occluded organic dyes. A significant adhesive-strength reinforcement of complex microgels can often be obtained, however, by inclusion (coflocculation) of polymer-emulsion adhesives (latexes), especially those of the acrylic type.

The example to follow demonstrates the instantaneous and complete flocculating action of the in-situ-synthesized complex microgels of the present invention in aqueous dispersions of organic color dyes.

EXAMPLE V

Distilled water in the amount of 249.5 g along with 0.5 g of an aqueous dispersion of a violet organic dye (Helmerco Blue MGW by American Cyanamid) were added to a beaker with a capacity of 800 cm$^3$. A calcium-silico-aluminate microgel was synthesized in situ using the procedures and reagent proportions employed in Example I.

The colloidal behavior of the freshly flocculated colored medium (slurry of complex microgel with occluded dye particles) was similar to that of the white (colorless) complex microgels from Examples I and II, the supernatant being colorless and crystal clear. The filtration of the above complex-microgel slurry yielded a completely uniformly colored filtercake and a colorless, clear filtrate. Identical results to those described above were also obtained with numerous other dyes.

The subsequent example further demonstrates the unique flocculating power of the complex functional microgels of the present invention, synthesized in situ in aqueous dispersions of polymer-emulsion adhesives. As is well known to those skilled in the art, it is impossible for all practical purposes to rapidly and completely flocculate the latter disperse adhesives with the aid of prior-art flocculating processes and agents.

EXAMPLE VI

Distilled water in the amount of 249.0 g along with 1.0 g of 40%-solids ultrafine acrylic polymer-emulsion adhesive were added to a beaker with a capacity of 800 cm$^3$. A calcium-silico-aluminate microgel was synthesized in situ, using the procedures and reagent proportions employed in Example I.

The above adhesive is representative of a new class of ultrafine waterborne polymer-emulsion adhesives for "microadhesion," having particle diameters finer than 55 nm and $T_g$ (glass-transition temperature) of from $-60°$ C. to $+20°$ C. Microadhesive applications of these materials were disclosed by the applicant in the co-pending U.S. patent application Ser. No. U.S. Pat. No. 5,240,561 (ACID-TO-ALKALINE PAPERMAKING PROCESS) incorporated herein by reference.

The microadhesion referred to above represents a new concept, unknown in the prior art. Specifically, microadhesion relates to "microadhesive Joints" formed when two "microadhints," e.g., microscopical solid particles, are glued together by a single, or essentially single, highly deformable adhesive particle. It is important to point out, though, that forming microadhesive joints is possible only with the aid of a practically instantaneous, indiscriminate and complete flocculation process. The slow, selective (rather than indiscriminate) and incomplete flocculation processes of the prior art make the formation of the above-defined microadhesive joints impossible for all practical purposes, due to the unavoidable selective aggregation and separation of adhesive particles and the disperse solid particles to be cemented.

The colloidal behavior of the freshly flocculated medium (slurry of complex microgel with occluded adhesive particles) was essentially the same as that of the slurries of freshly synthesized complex microgels from Examples I, II, IV or V, the supernatant being crystal clear and completely devoid of any disperse phase. The flocculated medium filtered rapidly through a qualitative filter paper (coarse openings), the filtrate being as clear as the above-mentioned supernatant.

Identical results, i.e., instantaneous, indiscriminate and complete flocculation (coflocculation) of all evaluated disperse systems, encompassing, among other things, commercial polymer-emulsion adhesives (latexes), dispersions of dyes, dispersions of mineral and organic pigments, and even notoriously flocculation-resistant dispersions of submicroscopical (ultrafine) solid particles having diameters smaller than 0.1 $\mu$m, were obtained with the aid of the in-situ-synthesized complex microgels under discussion. For all practical purposes, identical results to those described above were also obtained when sodium zincate was used together with, or instead of, sodium aluminate and when calcium nitrate was used instead of calcium chloride.

It is worth noting in the above context that there are no equivalent universal flocculation processes or flocculating agents known in the prior art, which, like the in-situ-synthesized complex microgels of the present invention, are capable of an instantaneous, indiscriminate and complete flocculation of such defiant colloidal systems as aqueous dispersions of polymer adhesives, dyes and ultrafine solid or liquid (water-immiscible) particles.

As is readily understood by those skilled in the art, the above-mentioned findings have many important commercial implications. For example, groundwood pulps used in paper making are more or less color deficient (revealing undesirable yellow undertones), making the use of combinations of blue and red dyes virtually mandatory. Unfortunately, the usually expensive organic dyes attach very inefficiently to cellulosic fibers, a substantial proportion of the former passing as persistent contaminants into spent process water from the acidic and alkaline papermaking processes of the prior art. It has also been very difficult in the prior art to consistently maintain a proper quantitative balance of multiple-dye combinations during the recirculation on the paper machine of incompletely flocculated furnishes whose colloidal properties, in general, and the state of flocculation, in particular, incessantly change in a manner beyond practical control.

Whereas the use of color dyes in papermaking furnishes has became an indispensable daily routine despite considerable operational difficulties, a similar use of the immensely valuable polymer-emulsion adhesives is still quite impractical. Since the latter particulate adhesives cannot be adequately dealt with by the flocculating mechanisms at the foundation of the acidic and alkaline papermaking processes of the prior art, their use in paper furnishes would result, among other things, in plugging of paper-machine felts, surface picking of paper and a variety of other sticking problems, the intolerable contamination of spent process water notwithstanding. In a radical contrast, none of the above problems associated with prior-art papermaking processes occur with the papermaking process based on the in-situ-synthesized complex functional microgels of the present invention, disclosed by the applicant in the co-pending U.S. patent application Ser. No. 07/836,220 ("Acid-to-Alkaline Papermaking Process"), filed Feb. 10, 1992, incorporated herein by reference. The papermaking process in question makes it possible to employ simultaneously many different dyes and/or polymer-emulsion adhesives while retaining the latter 100% with the flocculated furnishes and totally eliminating the contamination of spent process water. The latter papermaking process was also found to be most suitable for the manufacture of wet-laid nonwoven products.

The in-situ-synthesized complex functional microgels of the present invention, having an instantaneous, indiscriminate and complete flocculating action combined with intrinsic cementing and surface-chemistry-modifying properties, are also uniquely suited for the manufacture of practically countless types of modern aggregate pigments. The complex-microgel-based process and compositions for the manufacture of custom-designed aggregate-pigment products with vastly improved optical efficacy and a variety of built-in novel functional performance properties were disclosed by the applicant in U.S. Pat. Nos. 5,116,418 (PROCESS FOR MAKING STRUCTURAL AGGREGATE PIGMENTS); 5,279,663 (LOW-REFRACTIVE-INDEX AGGREGATE PIGMENT PRODUCTS); 5,312,484 ($TiO_2$-CONTAINING COMPOSITE PIGMENT PRODUCTS); and 5,346,546 (AGGREGATE-$TiO_2$ PIGMENT PRODUCTS) incorporated herein by reference.

While certain preferred practices and embodiments of this invention have been set forth in the foregoing specification, it is understood by those skilled in the art that other variations and modifications can be employed within the scope of the teachings of the present invention. The detailed description is, therefore, not to be taken in a limiting sense and the scope of the present invention is best defined by the claims to follow.

What is claimed is:

1. A process for synthesizing complex functional microgels with rapid formation kinetics in an aqueous medium, comprising the steps of
    (a) preparing a transient, chemically reactive subcolloidal hydrosol having particle size larger than 10 Å and smaller than 50 Å by blending
    (i) an aqueous solution of at least one reagent selected from the group consisting of alkali-metal silicates and quaternary ammonium silicates with
    (ii) an aqueous solution of at least one reagent selected from the group consisting of alkali-metal aluminates and alkali-metal zincates, wherein the ratio of the reagents of (i), present in said aqueous medium at a concentration of from 0.05% to 2.5%, by weight, to the reagents of (ii), present in the aqueous medium at a concentration of from 0.05% to 2 5%, by weight, is from 1:10 to 10:1, by weight; and
    (b) blending an aqueous solution of at least one cross-linking agent selected from the group consisting of bivalent and multivalent inorganic salts and organic, cationically active chemical compounds with at least two reactive groups in each molecule, present in said aqueous medium at a combined concentration of up to 5.0%, by weight, with said resultant transient, chemically reactive subcolloidal hydrosol from step (a) to cross-link said chemically reactive subcolloidal hydrosol and synthesize said complex functional microgels, wherein the ratio of said said cross-linking agents from (b) to said chemically reactive subcolloidal hydrosol from (a) is from 1:10 to 10:1, by weight.

2. The process according to claim 1, wherein said alkali-metal silicates are selected from the group consisting of sodium and potassium silicates and quaternary ammonium silicates.

3. The process according to claim 1, wherein said alkali-metal aluminates are selected from the group consisting of sodium and potassium aluminates and said alkali-metal zincates are selected from the group consisting of sodium and potassium zincates.

4. The process according to claim 1, wherein said bivalent and multivalent inorganic salts are selected from the group consisting of water-soluble, chemically stable inorganic salts.

5. The process according to claim 1, wherein said organic, cationically active chemical compounds with at least two reactive groups in each molecule are selected from the group consisting of cationic surface active agents, organometallic Werner complexes and organic, cationic polyelectrolytes.

6. The process according to claim 1, wherein the pH of said aqueous medium containing said complex functional microgels resulting from steps (a) and (b) is from 4.0 to 12.5.

7. Complex functional microgels synthesized from transient, chemically reactive subcolloidal hydrosols having particle size larger than 10 Å and smaller than 50 Å formed of
    (a) at least one reagent selected from the group consisting of alkali-metal silicates and quaternary ammonium silicate used at a concentration of 0.05 to 2.5%, by weight; and
    (b) at least one reagent selected from the group consisting of alkali-metal aluminates and alkali-metal zincates used at a concentration of 0.05 to 2.5%, by weight; wherein the ratio of the reagents of (a) to the reagents of (b) is from 1:10 to 10:1, by weight; cross-linked by at least one agent selected from the group consisting of bivalent and multivalent inorganic salts and organic cationically active chemical compounds with at least two reactive groups in each molecule used in a cmbined concentration of up to 5.0%, by weight, the ratio of said cross-linking agents to said chemically reactive by weight, subcolloidal hydrosols being from 1:10 to 10:1, by weight.

8. Complex functional microgels according to claim 7, wherein said alkali-metal silicates are selected from the group consisting of sodium and potassium silicates and quaternary ammonium silicates.

9. Complex functional microgels according to claim 7, wherein said alkali-metal aluminates are selected from the group consisting of sodium and potassium aluminates and said alkali-metal zincates are selected from the group consisting of sodium and potassium zincates.

10. Complex functional microgels according to claim 7, wherein said complex microgels contain up to 5.0%, by weight, of organic matter built in chemically from said organic cationically active chemical compounds with at least two reactive groups in each molecule.

* * * * *